3,041,310
POLYSTYRENE-STYRENE COPOLYMER
MOLDING COMPOSITIONS
Murray A. Luftglass, Fullerton, and Milton Peldon, Torrance, Calif., assignors to Shell Oil Company, a corporation of Delaware
No Drawing. Filed July 14, 1959, Ser. No. 826,909
7 Claims. (Cl. 260—45.5)

The present invention relates to polystyrene molding compositions and more particularly, to polystyrene molding compositions having improved toughness.

Recently, considerable effort has been directed toward the development of tough polystyrene molding compositions which are known in the art as high impact polystyrenes. Such materials are generally prepared by the use of a minor proportion of butadiene and a larger proportion of styrene monomer. Various techniques have been developed for combining these monomers and these include making copolymers and blending polymers of the individual monomers. There are many factors in processing conditions which effect the ultimate toughness of the product, and conditions which are satisfactory for one method of preparing high impact polystyrene are frequently of little value in other methods.

It has been found, in many cases, that blends of rubber with polystyrene give a mottled appearance probably because of the solubility of the copolymer in the matrix. However, it has been found that by blending a tapered copolymer of a conjugated diene hydrocarbon and styrene with polystyrene, a product which is very attractive and constant in appearance is attained.

While blending of tapered copolymers and polystyrene provides a product having a good appearance, it has not been possible prior to the present invention to provide the desired high impact properties.

It is the primary object of this invention to provide a polystyrene molding composition having an improved appearance, and an improved toughness. Another object of this invention is to provide a process for preparing a high impact polystyrene molding composition in which a copolymer of a conjugated diene and styrene is blended with polystyrene.

It has now been found, quite unexpectedly, that the above-mentioned characteristics are obtained when the tapered copolymer has been prepared as explained hereinafter, and is treated to increase crosslinking.

As used herein, the term "tapered copolymer" means a copolymer which is heterogeneous in composition and contains nuclei which are preponderantly a polymer of one of the monomers with grafts on said nuclei which contain increasing proportions of the other monomer or a mixture of copolymers of varying composition prepared by incremental monomer addition during polymerization. Thus in the present invention, the initial monomers subjected to polymerization conditions contain more rubber monomer than styrene thus forming nuclei of rubber rich polymers. Then styrene is added so that a higher styrene to rubber monomer ratio is present under intermediate polymerizing conditions to form a copolymer on or around the copolymeric nuclei which is richer in styrene than the nuclei. More styrene is then added so that the proportion of monomer is now higher in styrene and lower in rubber monomer. Thus the polymer contains an increasing amount of styrene and a decreasing amount of rubber. This is continued until the final polymerization is made from a high styrene to rubber monomer ratio. In general, the initial polymer will be at least 50% and preferably above 60% conjugated diene while the final polymer will be at least 50% styrene and preferably above 60%. Preferably the initial monomer ratio will be from 60 to 90% conjugated diene and from 10 to 30% styrene, and the final monomer ratio will be from 10 to 30% conjugated diene and 60 to 90% styrene.

When a tapered copolymer is prepared as described above, its solubility characteristics with polystyrene are good, and excellent blends can be obtained which provide the improved appearance mentioned above. Thus it is seen that the resulting blended molding composition contains rubbery polymer which provides improved toughness, and yet the overall composition contains a major proportion of styrene. However, blends of tapered copolymers of this nature and polystyrene generally provide impact strengths of the order of 0.3 to 0.8 foot lb./inch of notch. While the upper part of the range is close to the accepted values for high impact polystyrene, many commercial products have impact strengths of the order of 1.0–2.0 and even higher values are considered very desirable.

The present invention provides these higher values by treating the tapered copolymers to increase crosslinking after at least 30% of total monomer is converted. It is not understood exactly why this treatment provides increased impact strength, but test results show that impacts of 2.0 or more can be attained without any substantial loss of other desirable physical properties.

The monomers suitable for the preparation of the rubbery component which are useful in the present invention include aliphatic conjugated dienes having from 4–6 carbon atoms such as butadiene, isoprene and chloroprene. Butadiene is the preferred rubber monomer. The term styrene as used in this application is meant to be vinyl benzene and the two terms may be used interchangeably. In general, the proportions of ingredients may vary over rather wide ranges, and the final composition may contain from about 70 to about 96 parts by weight of styrene in combination with from about 4 to about 30 parts by weight of rubbery composition. Particularly good results are obtained when the amount of styrene in the final composition is high, say 90–96 parts styrene with from 4 to 10 parts of rubbery monomer.

The tapered copolymer may contain styrene and a synthetic rubber monomer in a rather wide range of proportion. In general, however, the range would be a ratio of from about 1:2 to 2:1 parts styrene to rubber monomer and a ratio of about 1:1 is considered optimal.

The polystyrene which is blended with the tapered copolymer may be any polymeric styrene, but is preferably a homopolymer having an intrinsic viscosity of from about 0.7 to 1.1. When the intrinsic viscosity is outside the above range, the polystyrene is still valuable, but low viscosities result in a lower impact strength and higher viscosities provide a product which has improved impact but poorer flow properties. Thus it is preferred to use a commercial crystal grade polystyrene. The polystyrene may also contain small amounts of other olefin materials. For example, it may be a copolymer of styrene and a rubbery monomer, but the ratio of styrene to rubber monomer should be at least 20:1. In other words the polystyrene component should have at least 95% by weight of styrene monomer.

In general the polystyrene and tapered copolymer may be blended by any of the conventional methods for blending polymeric olefins. They may be blended in latex form, and coagulated or they may be physically mixed and mechanically blended, or both. Physical mixing may be achieved with a banbury mixer, screw extruder, two-roll rubber mill or similar device. Preferably, the blending is accomplished in two or more stages. In the first stage, a small amount of polystyrene is blended with the tapered copolymer. The blending may be accomplished by blending the emulsion copolymer and a polystyrene emulsion and the mixture coagulated with brine and or any other known method for coagulating emulsion polymers, and the coagulum is washed and dried. The dried material is then mixed with the remainder of the polystyrene and mechanically blended as mentioned above. Especially good results are obtained when a two stage blending is used in which polystyrene or a styrene butadiene copolymer containing 75–100% styrene and 0–25% butadiene is used in the first blending step, and the polystyrene used in the final step is substantially all styrene. For example, the first used styrene butadiene copolymer may have 85% styrene and 15% butadiene. This is a particularly advantageous composition. In an alternate process the tapered copolymer or the product from the emulsion blending step may be mixed in a three-stage blending process. For example, it may be mixed with a small amount of polystyrene after the initial blending and before the final blending with polystyrene. This has produced the best results.

In addition, inert ingredients (those not entering into the polymerization reaction) may be present such as lubricants, antioxidants, optical bleaches and inert fillers. These materials may be added during polymerization or to the mixture before or during mechanical blending. The time of addition of the inert materials is not critical, and they may be added at any convenient time during the process.

The proportions of polystyrene and tapered copolymer which are blended together may vary over a rather large range depending somewhat on the proportions of styrene and conjugated diene monomer in the tapered copolymer. In general, there will be from about 50–95 parts by weight of polystyrene and from about 5 to 50 parts by weight of tapered copolymers in the blend.

The emulsion polymerization used for the tapered copolymer may be any of the types known in the rubber industry such as the so-called hot process or the cold process. Preferably the hot process is used.

As mentioned above, it is important to treat the tapered copolymer in order to increase crosslinking after at least 30% of total monomer is converted. This has the effect of providing the desired high impact characteristics which were not obtainable in this type of blend prior to the present invention. In general, any method of treating the emulsion copolymer which would tend to increase crosslinking will produce a beneficial result. In the preferred form of this invention a small amount of divinyl benzene is added at a conversion point greater than 30% conversion of the total monomer. The amount of divinyl benzene will be rather small and will range from say 0.01 to 5.0% and preferably from 0.1 to 1.0% of total monomer. When divinyl benzene is used, it may be added along with a charge of styrene or between charges as desired at a later stage in the polymerization reaction. It is also possible to treat the tapered copolymer after polymerization is completed, i.e., post treatment. One of such treatments involves heating the copolymer at 80° C. for a period of 4 hours with a small amount of potassium persulfate or equivalent. However, the divinyl benzene treatment is preferred, because total processing time is less and the divinyl benzene provides a noticeable improvement in clarity.

In order to better define the crosslinking of the tapered copolymer, the amount of gel as determined by the Harris-Cage method may be used. See J. Poly. Sci. 6, 434 (1951). In general, the amount of gel should be between about 50 and 100%, and preferably between about 75 and 95%.

In order to provide a more complete description of the invnetion, and to better illustrate the preferred method of carrying out the invention, the following examples are given:

*Example I*

A tapered copolymer was prepared by adding the following ingredients to a stirred reactor at a temperature of 5° C.

| Material: | Initial charge, parts by wt. |
|---|---|
| Butadiene | 50.0 |
| Styrene | 21.4 |
| Para-menthane hydroperoxide | 0.10 |
| Sodium formaldehyde sulfoxylate dihydrate | 0.10 |
| Water | 200 |
| Dresinate 515 | 2.11 |
| Sodium fatty acid soap | 2.07 |
| Tripotassium phosphate | 0.37 |
| Tamol N | 0.02 |
| $FeSO_4.7H_2O$ | 0.014 |
| Versene Fe-3 | 0.021 |

Dresinate 515 is an aqueous solution of a soap of disproportionated rosin acid. Tamol N is a condensation product of formaldehyde and sodium naphthalene sulfonate. Versene Fe-3 is a mixture of the tetrasodium salt of ethylene diamine tetra-acetic acid with the monosodium salt of N,N-di(2-hydroxyethyl)glycine.

After 20% of the monomer has been converted, 8.6 parts of styrene was added. Similarly 8.0 parts styrene were added at 40% conversion, 7.0 parts styrene were added at 60% conversion, and 10.0 parts styrene were added at 80% conversion. After completion of the polymerization, 0.5 part potassium persulfate and 5.0 parts water were added and the mixture was heated to a temperature of 80° C. for a period of four hours to give a substantially complete conversion of monomer. The tapered copolymer had a gel content of 95%. Then 20 parts of an emulsion copolymer containing 15% butadiene and 85% styrene constituents were added to the tapered copolymer emulsion and the emulsion coagulated with brine acid. The coagulum was washed and dried. 880 parts of a commercial crystal grade polystyrene and 30 parts of a mineral oil lubricant were added to the dry coagulant and the material physically blended in an extruder. The polymer was then molded into test bars and tested for physical properties. The results of these tests are summarized below as follows:

| | Polystyrene-tapered copolymer blend |
|---|---|
| Notched Izod impact resistance at room temp., ft. lbs./in. notch | 2.0 |
| Hardness, Rockwell M | 40 |
| Tensile, p.s.i. | 3000–4000 |
| Tensile modulus, p.s.i. | $3.8 \times 10^5$ |
| Elongation, percent | 20–30 |
| Heat distortion temp., °F | 170–175 |

From the above data, it is evident that the tapered copolymer blend of Example I gives excellent impact resistance while at the same time retaining other desirable physical properties.

Tapered copolymers which were not treated to increase crosslinking were blended with polystyrene in proportions similar to those given above, and the impact was only 0.7 to 0.9 ft. lb./in.

*Example II*

The following materials were charged into a stirred reactor and the material brought to a temperature of 60° C.

| Material: | Initial charge, parts by weight |
|---|---|
| Butadiene | 55.0 |
| Styrene | 18.0 |
| Sodium fatty acid soap | 4.6 |
| Potassium persulfate | 0.3 |
| Water | 200.0 |

A 60° C. temperature was retained throughout the polymerization reaction. After 20% conversion of the total monomer, 8.5 parts styrene are added. Similarly 3.5 parts are added at 40% conversion, 5.0 parts are added at 60% conversion, and 10.0 parts are added at 80% conversion total monomer. In addition to the styrene added at 60% conversion, 0.5 part of divinyl benzene was added.

After polymerization was complete, the copolymer had a gel content of 90% as determined by the Harris-Cage method. 20 parts of a polystyrene latex was added to the tapered copolymer, and the emulsion coagulated with brine acid. The coagulant was washed and dried. 880 parts of a commercial crystal grade polystyrene and 30 parts of a mineral oil lubricant were added to the dry coagulant and the material physically blended in an extruder. The polymer was molded into test bars and the following properties were found:

| | |
|---|---|
| Notched Izod impact resistance at room temp., ft. lbs./inch | 2.0–2.5 |
| Hardness, Rockwell M | 40–45 |
| Tensile, p.s.i. | 3500–4000 |
| Elongation, percent | 20–30 |
| Heat distortion temp., °F | 175–180 |

Thus it is seen that by using divinyl benzene at reaction temperatures (60° C.) after a substantial proportion of the reaction has been completed, it was possible to obtain good physical properties without any post treatment. In this way the 4 hours processing used in Example I is eliminated. The use of divinyl benzene is known to improve clarity, but in other polymerization processes it does not provide such a marked increase in impact.

*Example III*

For the sake of comparison, a tapered copolymer was prepared which contained 85% styrene and 15% butadiene but it was not blended with polystyrene. The styrene was added in increments while the butadiene was all added initially so that the initial polymerization was mostly butadiene and the final polymerization was substantially all styrene. Two runs were made at different temperatures and the resulting polymer was tested. The following properties were found:

| Polymerization Temp., °C. | Izod Impact, Ft. lbs./inch Notch | Hardness, Shore "D" | Heat Distortion, °C. |
|---|---|---|---|
| 5 | 0.63 | 79–80 | |
| 50 | 0.73 | 78 | 54 |

From the above it is seen that the straight tapered copolymers not only fail to give the desired high impact, but also provide poor heat distortion values. Efforts were made to improve these values and, although they could be improved with special techniques, the best value obtained gave an impact strength of 0.94 foot lb./inch notch and a heat distortion temperature of 64° C. The straight tapered copolymer was also made using 0.05 part divinyl benzene, but the impact strength in this run was only 0.7 ft. lb./in. notch.

*Example IV*

The following materials were charged into a stirred reactor and the material brought to a temperature of 50° C.

| Material: | Initial charge, parts by weight |
|---|---|
| Butadiene | 50 |
| Styrene | 21.4 |
| Sodium fatty acid soap | 4.6 |
| Divinylbenzene | 0.25 |
| Potassium persulfate | 0.3 |
| Water | 200.0 |

A 50° C. temperature was retained throughout the polymerization reaction. After 20% conversion of the total monomer, 8.6 parts of styrene were added. Similarly 8.0 parts were added at 40% conversion, 7.0 parts at 60% conversion and 10.0 parts at 80% conversion of total monomer.

After polymerization was complete the copolymer had a gel content of 60% as determined by the Harris-Cage method. Fifteen parts of an emulsion polystyrene was added to the tapered copolymer, and the emulsion coagulated in brine. The crumb was washed and dried. Eight hundred eighty-five parts of a commercial crystal grade polystyrene were added to the dry crumb and the material physically blended in an extruder. The polymer was molded into test bars and the Izod impact strength was 0.5 ft. lb./inch notch.

*Example V*

The procedure of Example IV was repeated except 0.75 part divinyl benzene was added initially. The gel content was 70% and the Izod impact strength was 0.7 ft. lb./inch notch.

*Example VI*

The procedure of Example IV was repeated except 0.5 part divinylbenzene was added at 60% conversion rather than initially. The gel content was 92% and the Izod impact strength was 1.9 ft. lbs./inch notch.

*Example VII*

The procedure of Example VI was repeated except 0.5 part divinyl benzene was added at 40% conversion. The gel content was 85% and the Izod impact strength was 1.3–1.5 ft. lbs./inch notch.

Examples IV through VII illustrate the importance of crosslinking and the importance of the time of addition of divinylbenzene to attain optimum crosslinking.

*Example VIII*

The procedure of Example VI was repeated except 0.25 part divinylbenzene was added at 60% conversion. The gel content was 87% and the Izod impact strength was 1.7–1.9 ft. lbs./inch notch.

*Example IX*

The procedure of Example VI was repeated except the initial butadiene charge was 55 parts and the initial styrene charge was 18 parts. Styrene increments were added as follows:

| | Parts |
|---|---|
| 20% conversion | 8.5 |
| 40% conversion | 3.5 |
| 60% conversion | 5.0 |
| 80% conversion | 10.0 |

The gel content was 89% and the Izod impact strength was 1.7–2.1 ft. lbs./inch notch.

A comparison of Examples VI and IX illustrates the effect of the variation of the butadiene-styrene ratio on the properties of the final product.

*Example X*

The procedure of Example VI was repeated except the butadiene charge was 40 parts and the initial styrene charge was 26.7 parts. A 32.8 parts styrene increment and 0.5 part divinylbenzene increment was added at 60% conversion. The gel content was 88% and the Izod impact strength was 1.4 ft. lbs./inch notch.

*Example XI*

The procedure of Example VI was repeated except 0.005 to 0.1 part of dodecyl mercaptan modifier was added initially. It was found that the gel content decreased to 84%, and the impact strength decreased to 1.5 ft. lb./inch notch. However, when the reaction temperature was increased as the modifier charge was increased and the divinyl benzene amount and time of addition changed (the amount was increased as the modifier charge was increased, and the addition time was delayed as the modifier charge was increased) to achieve equivalent crosslinking, products were similar to those obtained in Example VI above. Addition of the modifier minimizes reaction die out problems, while resulting in an equivalent product through the use of the variations discussed above.

*Example XII*

The procedure of Example VI was repeated except the product was coagulated in isopropyl alcohol. The product had equivalent properties and improved color.

*Example XIII*

The procedure of Example VI was repeated except 25 parts of a mineral oil lubricant were emulsified in 25 parts of water using soap formed from 1 part of Acosix (refined tall oil). The emulsion was added to the latex prior to coagulation. Similarly good results were obtained.

The examples illustrate that the crosslinking of the tapered copolymer which is used as a blending agent with crystal grade polystyrene provides unexpectedly good properties. In addition, the polystyrene molding composition can be made without serious departure from conventional procedures and thereby provides a process having attractive commercial possibilities.

We claim as our invention:

1. A high impact polystyrene molding composition comprising an intimate mixture of (1) from about 50 to about 95 parts by weight of polystyrene and (2) from about 5 to about 50 parts by weight of a copolymer of styrene and an aliphatic conjugated diene selected from the group consisting of butadiene, isoprene and chloroprene in a weight ratio from about 1:2 to 2:1 parts of styrene to the said diene, the said copolymer being the emulsification copolymerization reaction product prepared by polymerizing the conjugated diene while adding styrene in a plurality of increments during the copolymerization reaction, the copolymer being crosslinked by reacting with divinyl benzene after at least 30% by weight of the total comonomers are converted, the crosslinked copolymer having a gel content between 50 and 100% measured by the Harris-Cage method.

2. The composition of claim 1 in which the conjugated diene is butadiene.

3. The composition of claim 1 in which the styrene is added in at least four intervals during the copolymerization.

4. A high impact polystyrene molding composition comprising an intimate mixture of (1) from about 50 to about 95 parts by weight of polystyrene and (2) from about 5 to about 50 parts by weight of a copolymer of styrene and an aliphatic conjugated diene selected from the group consisting of butadiene, isoprene and chloroprene, in a weight ratio from about 1:2 to 2:1 parts of styrene to the said diene, the said copolymer being the emulsification copolymerization reaction product prepared by polymerizing the conjugated diene while adding styrene in a plurality of increments during the copolymerization reaction, the copolymer being crosslinked by reacting with from 0.1 to 1.0 part by weight of divinyl benzene after at least 50% by weight of the total comonomers are converted, the crosslinked copolymer having a gel content between 75 and 95% measured by the Harris-Cage method.

5. The composition of claim 4 in which the conjugated diene is butadiene.

6. A high impact polystyrene molding composition comprising an intimate mixture of (1) from about 50 to about 95 parts by weight of polystyrene and (2) from about 5 to about 50 parts by weight of a copolymer of styrene and an aliphatic conjugated diene selected from the group consisting of butadiene, isoprene and chloroprene in a weight ratio from about 1:2 to 2:1 parts of styrene to the said diene, the said copolymer being the emulsification copolymerization reaction product prepared by polymerizing a mixture of the conjugated diene and less than half total styrene adding the remainder of the styrene in a plurality of increments during the polymerization reaction, with at least 20% of the styrene being added after 60% conversion of the total monomer, the copolymer being crosslinked by reacting with from 0.1 to 1.0 part by weight of styrene after at least 50% by weight of the total comonomers are converted, the crosslinked copolymer having a gel content between 75 and 95% measured by the Harris-Cage method.

7. The composition of claim 6 in which the conjugated diene is butadiene.

References Cited in the file of this patent

UNITED STATES PATENTS

| 2,474,807 | Schoene | July 5, 1949 |
| 2,597,951 | Romeyn et al. | May 27, 1952 |
| 2,614,093 | Wheelock | Oct. 14, 1952 |
| 2,755,270 | Hayes | July 17, 1956 |

FOREIGN PATENTS

| 210,417 | Australia | July 24, 1957 |

UNITED STATES PATENT OFFICE

CERTIFICATE OF CORRECTION

Patent No. 3,041,310            June 26, 1962

Murray A. Luftglass et al.

It is hereby certified that error appears in the above numbered patent requiring correction and that the said Letters Patent should read as corrected below.

In the grant, lines 1 and 2, and in the heading to the printed specification, line 4, name of second patentee, for "Milton Peldon", each occurrence, read -- Milton Feldon --.

Signed and sealed this 27th day of November 1962.

(SEAL)
Attest:
ESTON G. JOHNSON
Attesting Officer

DAVID L. LADD
Commissioner of Patents